United States Patent
Huang

(10) Patent No.: US 8,861,078 B2
(45) Date of Patent: Oct. 14, 2014

(54) LIGHT SOURCE ADJUSTING DEVICE AND PROJECTION SYSTEM COMPRISING THE SAME

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 703 days.

(21) Appl. No.: 13/092,535

(22) Filed: Apr. 22, 2011

(65) Prior Publication Data

US 2012/0105811 A1 May 3, 2012

(30) Foreign Application Priority Data

Nov. 3, 2010 (TW) ................. 099137757 A

(51) Int. Cl.
 G03B 21/14 (2006.01)
 G03B 21/20 (2006.01)
 G03B 33/06 (2006.01)
 H04N 9/31 (2006.01)

(52) U.S. Cl.
 CPC ........ G03B 21/2053 (2013.01); G03B 21/2033 (2013.01); G03B 33/06 (2013.01); H04N 9/315 (2013.01)
 USPC ............................................. 359/443; 353/31

(58) Field of Classification Search
 CPC .............. G03B 21/14; F21V 9/00; F21V 9/16
 USPC .................... 353/81; 359/443–461
 See application file for complete search history.

(56) References Cited

U.S. PATENT DOCUMENTS

| 7,543,959 B2 * | 6/2009 | Bierhuizen et al. ........... 362/293 |
| 7,547,114 B2 | 6/2009 | Li et al. |
| 8,008,694 B2 | 8/2011 | Xu et al. |
| 8,355,033 B2 | 1/2013 | Deppe |

(Continued)

FOREIGN PATENT DOCUMENTS

| CN | 101529162 | 9/2009 |
| CN | 101539270 | 9/2009 |

(Continued)

OTHER PUBLICATIONS

Office Action from related Chinese Appln. No. 201010554244.6 dated May 6, 2013. Summary translation attached.

(Continued)

Primary Examiner — Francis M Legasse, Jr.
Assistant Examiner — Jerry Brooks
(74) Attorney, Agent, or Firm — Grossman, Tucker, Perreault & Pfleger, PLLC

(57) ABSTRACT

A light source adjusting device and a projection system comprising the light source adjusting device are provided. The projection system further comprises a light source module which is capable of providing a first beam with a first wavelength. The light source adjusting device comprises a first angle selecting layer, a wavelength converting layer and a second angle selecting layer. The first angle selecting layer receives the first beam and allows a first portion of the first beam to pass therethrough to form a second beam that also has the first wavelength. The first portion of the first beam is a portion of the first beam that is less than an incident angle. The wavelength converting layer receives the second beam transmitted from the first angle selecting layer and converts the second beam with the first wavelength into a third beam with a second wavelength. The second angle selecting layer receives the third beam and allows the third portion of the third beam to pass therethrough to form a fourth beam that also has the second wavelength. The third portion of the third beam is a portion of the third beam that is less than an emergence angle. The second wavelength is larger than the first wavelength, and the emergence angle is less than the incident angle.

13 Claims, 4 Drawing Sheets

(56) References Cited

U.S. PATENT DOCUMENTS

| | | | |
|---|---|---|---|
| 2004/0150991 A1* | 8/2004 | Ouderkirk et al. | 362/231 |
| 2005/0279915 A1 | 12/2005 | Elofson | |
| 2008/0030984 A1* | 2/2008 | Harbers et al. | 362/231 |
| 2013/0126930 A1 | 5/2013 | Kabuki et al. | |

FOREIGN PATENT DOCUMENTS

| | | |
|---|---|---|
| CN | 101836160 | 9/2010 |
| JP | 2007-264603 | 10/2007 |
| JP | 2012-38452 | 2/2012 |
| TW | 200604466 | 2/2006 |
| TW | 200845744 | 11/2008 |

OTHER PUBLICATIONS

Office Action from related Chinese Appln. No. 201010554244.6 dated Jan. 2, 2014. Summary translation attached.

Office Action from related Taiwanese Appln. No. 099137757 dated May 21, 2013. Summary translation attached.

* cited by examiner

LIGHT SOURCE ADJUSTING DEVICE AND PROJECTION SYSTEM COMPRISING THE SAME

This application claims the benefit of the priority based on Taiwan Patent Application No. 099137757 filed on Nov. 3, 2010, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a light source adjusting device, and more particularly, to a light source adjusting device for a projection system.

2. Descriptions of the Related Art

Due to advantages, such as a long service life, a short start-up period, a wide display color gamut and convenience in increasing the dynamic contrast, light emitting diodes (LEDs) are now widely used in many display products. Especially in the projector industry, the use of LEDs as a light source of a projector can not only decrease the operating temperature of the projector, but also effectively reduce the volume of the projector to result in better portability as compared to conventional projectors using UHP lamps as light sources. Therefore, projectors using LEDs have won wide popularity among consumers.

However, because light beams emitted by the LEDs are relatively divergent, LEDs have poorer performance in terms of luminance and light emitting efficiency than conventional UHP lamps when used in projectors. On the other hand, increasing the number of LEDs to improve the luminance of a projector would lead to an excessively large volume of the projector and complex arrangement of internal components thereof.

Additionally, technologies that utilize blue light LEDs or ultraviolet (UV) light to excite blue phosphors, red phosphors and green phosphors disposed on the color wheel to generate the three primary colors (i.e., blue, red and green) respectively have been disclosed in the prior art. However, because the color wheel used in these technologies is of a mechanically rotary structure, it tends to have a longer response time and is liable for failure after an extended time period of operation. Moreover, such technologies using blue LEDs or UV light to excite phosphors cannot substantially overcome the problems of low luminance and poor light emitting efficiency.

In view of this, an urgent need still exists in the art to improve the luminance of light sources of projectors by using a limited number of optical components and within a limited space so that the projection system can have a better luminance performance and higher light emitting efficiency.

SUMMARY OF THE INVENTION

An objective of the present invention is to provide a light source adjusting device, which can convert a light source with a short wavelength and large etendue into a light source with a long wavelength and small etendue to improve the luminance and light emitting efficiency of a projection system.

To achieve the aforesaid objective, the light source adjusting device of the present invention comprises a first angle selecting layer, a wavelength converting layer and a second angle selecting layer, while the projection system comprises a light source adjusting device with a light source module for providing a first beam with a first wavelength. The first angle selecting layer of the light source adjusting device receives the first beam and allows a first portion of the first beam to pass therethrough to form a second beam that also has the first wavelength. The first portion is a portion of the first beam that is less than an incident angle. The wavelength converting layer receives the second beam from the first angle selecting layer and converts the second beam with the first wavelength into a third beam with a second wavelength. The second angle selecting layer receives the third beam and allows a third portion of the third beam to pass therethrough to form a fourth beam that also has the second wavelength. The third portion is a portion of the third beam that is less than an emergence angle. The second wavelength is larger than the first wavelength, and the emergence angle is less than the incident angle.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides both a light source adjusting device 3 that can help improve the luminance and light emitting efficiency of a projection system during operation, and a projection system 1 comprising the light source adjusting device 3. Because at least one set of light source adjusting devices 3 may be disposed in the projection system 1, the light source adjusting device 3 will be firstly described and then embodiments of the projection system 1 will be further described in detail.

Figure 1:
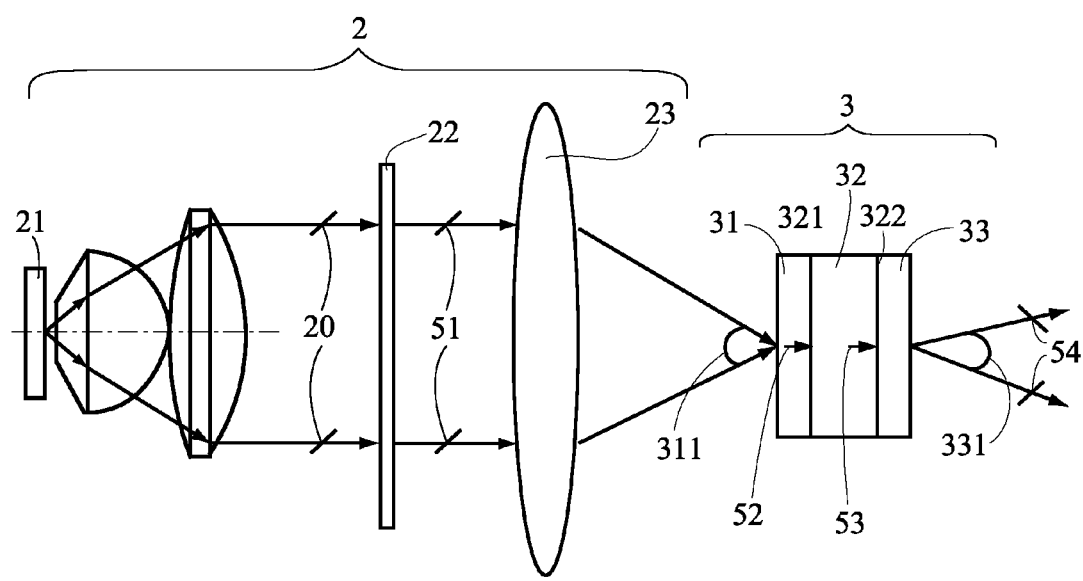
FIG. 1 is a schematic view of a light source adjusting device of the present invention.

As shown in FIG. 1, the light source adjusting device 3 of the present invention comprises a first angle selecting layer 31, a wavelength converting layer 32 and a second angle selecting layer 33. The first angle selecting layer 31 is disposed on a first surface 321 of the wavelength converting layer 32, and the second angle selecting layer 32 is disposed on a second surface 322 of the wavelength converting layer 32 opposite to the first surface 321.

Furthermore, the projection system 1 comprising the light source adjusting device 3 of the present invention further comprises a light source module 2 disposed adjacent to the light source adjusting device 3. Similarly, as shown in FIG. 1, the light source module 2 comprises a light source 21, a beam splitting unit 22 and a beam collecting unit 23. The light source 21 provides a light beam 20. The light beam 20 passes through the beam splitting unit 22 to form a first beam 51 with a first wavelength. Then, the beam collecting unit 23 collects the first beam 51 onto the first angle selecting layer 31 of the light source adjusting device 3.

The first angle selecting layer 31 receives the first beam 51 with the first wavelength and allows a first portion, which is less than an incident angle 311, of the first beam 51 to pass therethrough to form a second beam 52 that also has the first wavelength. The wavelength converting layer 32 receives the second beam 52 from the first angle selecting layer 31 and converts the second beam 52 with the first wavelength into a third beam 53 into a second wavelength for emission outwards. Finally, the second angle selecting layer 33 receives the third beam 53 and allows a third portion, which is less than an emergence angle 331, of the third beam 53 to pass therethrough to form a fourth beam 54 that has the second wavelength. The second wavelength is larger than the first wavelength, and the emergence angle 331 is less than the incident angle 311.

It shall be further appreciated that when the third beam 53 is incident onto the second angle selecting layer 33, a fourth portion of the third beam 53 larger than or equal to the emergence angle 331 is reflected by the second angle selecting layer 33. The fourth portion passes through the wavelength converting layer 32 and scatters from the first angle selecting layer 31 at a scattering angle which is substantially less than or equal to the incident angle 311, and is then transmitted through the beam collecting unit 23 to the beam splitting unit 22. Then, the beam splitting unit 22 reflects the fourth portion to the beam collecting unit 23 so that the beam collecting unit 23 collects the fourth portion to the first angle selecting layer 31. In other words, after passing through the wavelength converting layer 32 and scattering from the first angle selecting layer 31 at a new scattering angle, the fourth portion will be re-collected to the first angle selecting layer 31.

In a preferred embodiment of the light source adjusting device 3 of the present invention, the beam collecting unit 23 is a convex lens, the beam splitting unit 22 is a dichroic mirror that transmitting the first wavelength and reflecting other wavelengths, and both the first angle selecting layer 31 and the second angle selecting layer 33 are a multi-layer coating. The first angle selecting layer 31 defines the incident angle 311, which is substantially between ±30 degrees and ±90 degrees and is preferably ±60 degrees. The second angle selecting layer 33 defines the emergence angle 331, which is substantially smaller than ±30 degree. Furthermore, the wavelength converting layer 32 comprises a phosphor, and the first wavelength is between 420 nm and 490 nm.

The propagation route of the beam in the wavelength converting layer 32 will be further described as follows. After the first portion of the first beam 51 less than the incident angle 311 passes through the first angle selecting layer 31 to form the second beam 52, the second beam 52 is converted into the third beam 53 with the second wavelength by the wavelength converting layer 32. In terms of the scattering angles of the third beam 53, (1) a portion of the third beam 53 less than the emergence angle 331 will pass through the second angle selecting layer 33; and (2) a portion of the third beam 53 no less than (i.e., equal to or larger than) the emergence angle 331 will be reflected by the second angle selecting layer 33. Furthermore, within the portion of the third beam 53 that is no less than the emergence angle 331, (i) a portion no less than the emergence angle 331 and no less than the incident angle 311 will be reflected repeatedly between the first angle selecting layer 31 and the second angle selecting layer 33; and (ii) a portion no less than the emergence angle 331 but less than the incident angle 311 will be reflected by the second angle selecting layer 33 to the beam splitting unit 22 via the first angle selecting layer 31 and the beam collecting unit 23, then be reflected back to the light source adjusting device 3 by the beam splitting unit 22, and pass through the second angle selecting layer 33 once the scattering angle thereof becomes less than the emergence angle 331. What is described above is the propagation route of the third beam 53 in the wavelength converting layer 32, and in the preferred example, the emergence angle 331 is 30 degrees and the incident angle 311 is 60 degrees.

The projection system 1 of the present invention comprises at least one light source module 2, at least one light source adjusting device 3 and an imaging module 4. The at least one light source module 2 provides the first beam 51 with the first wavelength, and the imaging module 4 receives and processes the fourth beam 54 to form an image as an output. Furthermore, the imaging module 4 comprises either a liquid crystal display (LCD) unit, a digital micro-mirror device (DMD), or a liquid crystal on silicon (LCOS) unit.

Figure 2:
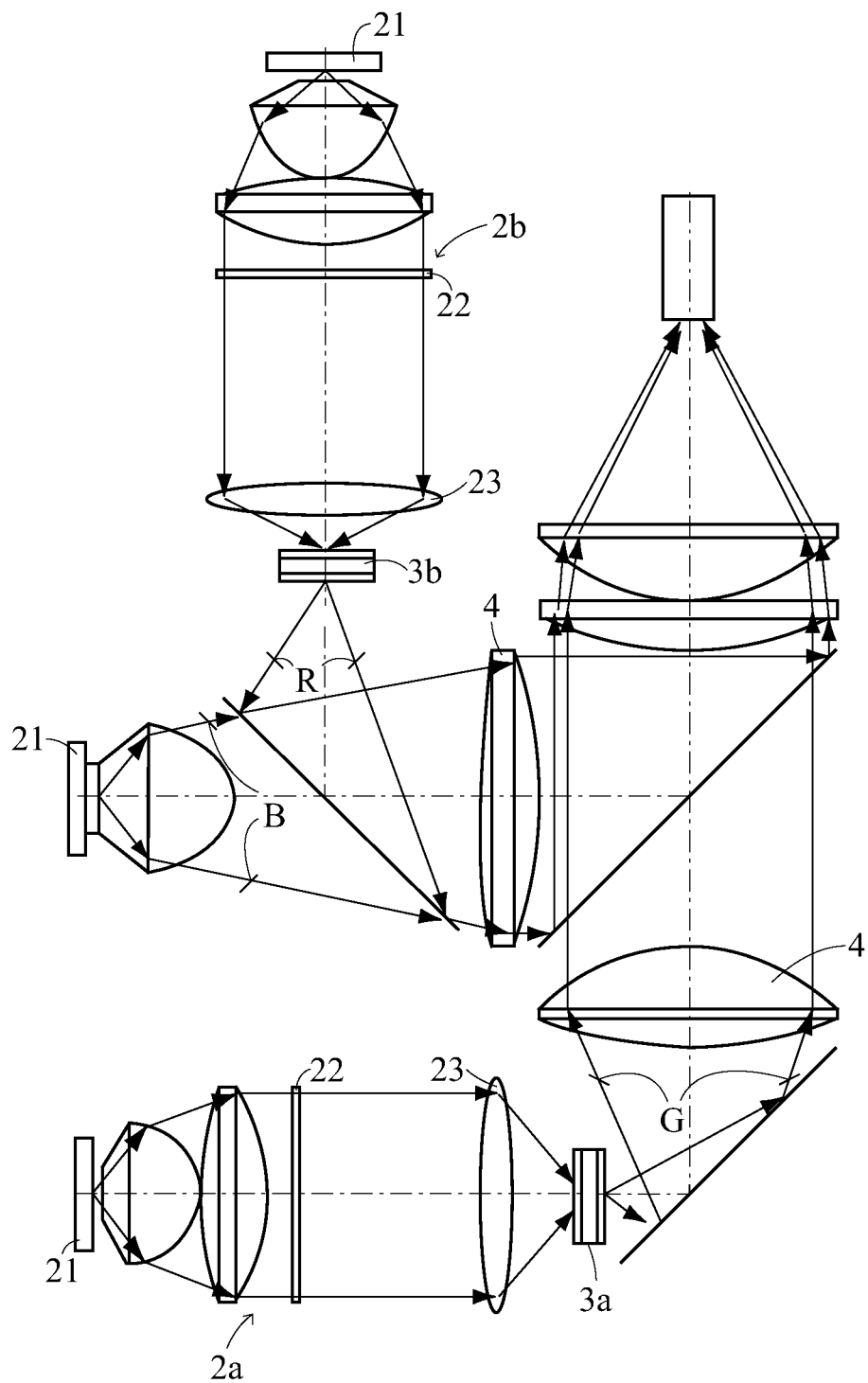
FIG. 2 illustrates the first embodiment of a projection system of the present invention.

The first embodiment of the projection system 1 of the present invention is shown in FIG. 2. The at least one light source module 2 of the projection system 1 comprises a first light source module 2a and a second light source module 2b, while the at least one light source adjusting device 3 comprises a first light source adjusting device 3a and a second light source adjusting device 3b corresponding to the first light source module 2a and the second light source module 2b respectively. In this embodiment, the light source 21 is a blue light emitting diode (blue LED), the first wavelength is a blue light wavelength, and the second wavelength is either a green or red light wavelength. In detail, in this embodiment, the second wavelength of the first light source adjusting device 3a is the green light wavelength, while the second wavelength of the second light source adjusting device 3b is the red light wavelength. Therefore, in the first embodiment, the light beam projected by the projection system 1 is obtained through the combination, via the optical units in the projection system 1, of a blue light B emitted from a blue light source, a green light G emitted from a first blue LED and passing through the first light source module 2a and the first light source adjusting device 3a, and a red light R emitted from a second blue LED and passing through the second light source module 2b and the second light source adjusting device 3b.

Figure 3:
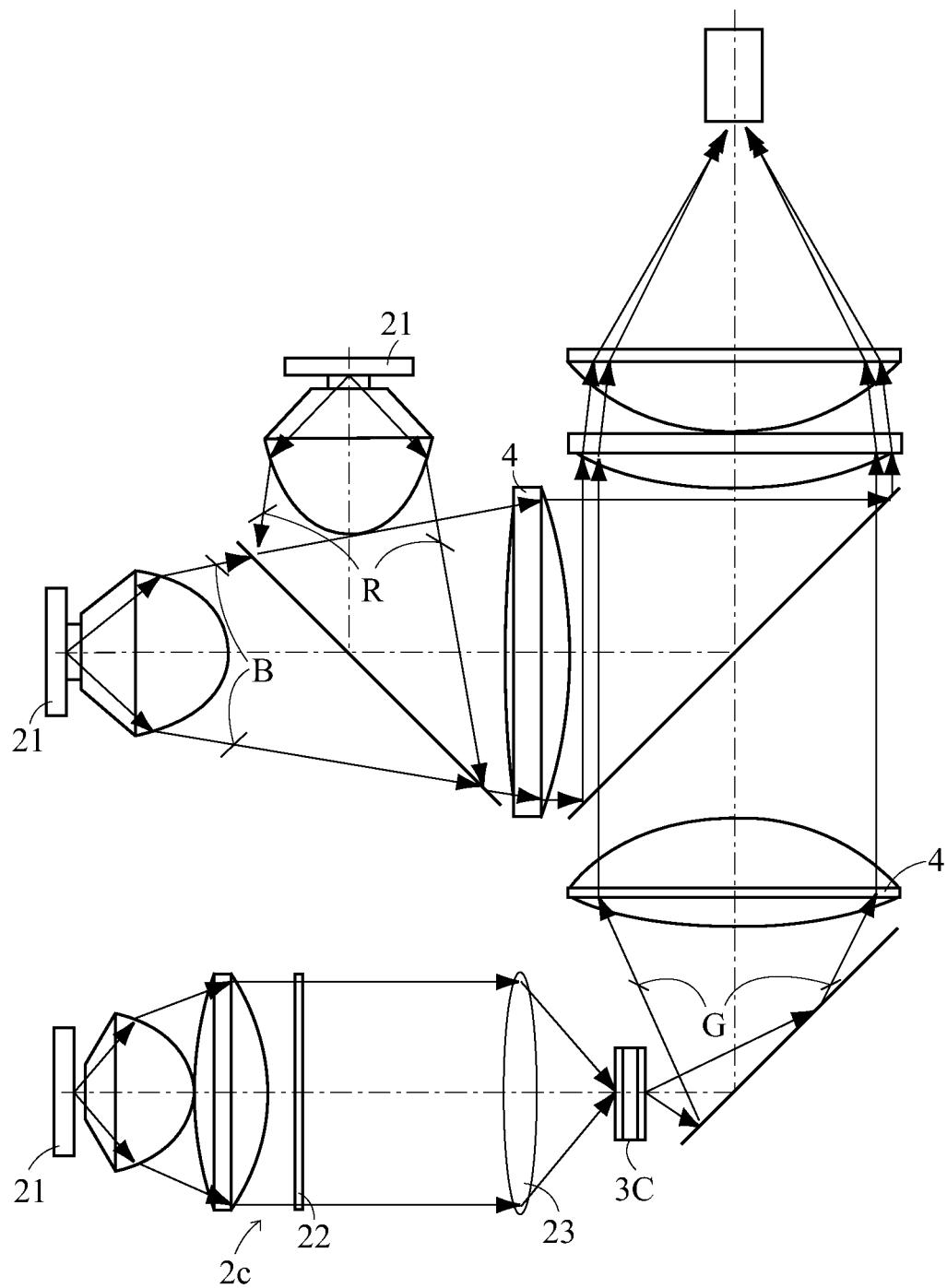
FIG. 3 illustrates the second embodiment of the projection system of the present invention.

The second embodiment of the projection system 1 is shown in FIG. 3. The at least one light source module 2 of the projection system 1 comprises a light source module 2c, while the at least one light source adjusting device 3 comprises a light source adjusting device 3c corresponding to the light source module 2c. In this embodiment, the light sources 21 of the projection system 1 are a blue LED, a blue light source and a red light source respectively, while the second wavelength is a green light wavelength. In the second embodiment, the light bam projected by the projection system 1 is obtained through the combination, via the optical units in the projection system 1, of a blue light B emitted from the blue light source, a red light R emitted from the red light source, and a green light G emitted from the blue LED and passing through the light source module 2c and the light source adjusting device 3c.

Figure 4:
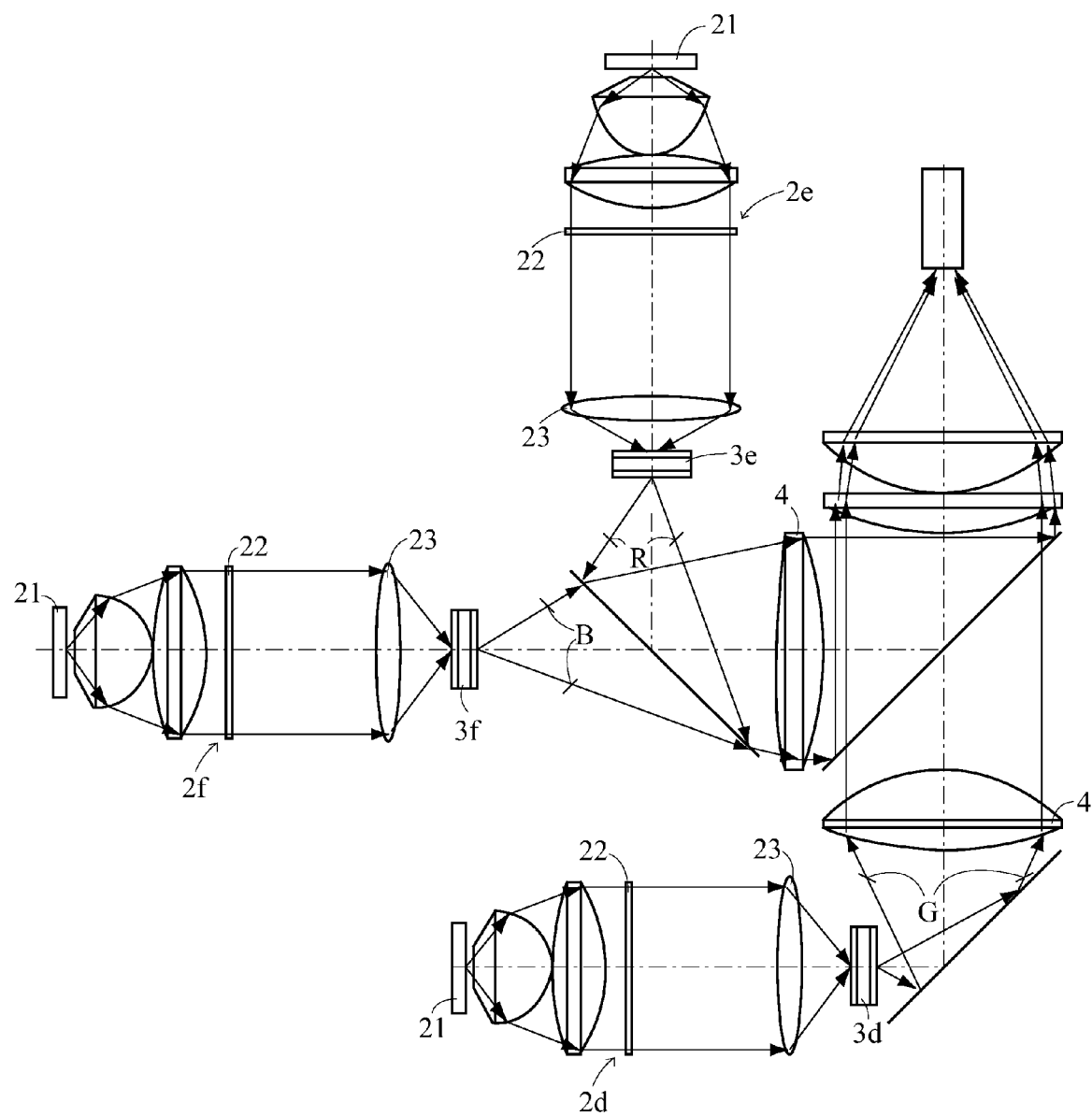
FIG. 4 illustrates the third embodiment of the projection system of the present invention.

The third embodiment of the projection system 1 is shown in FIG. 4. The at least one light source module 2 of the projection system 1 comprises a first light source module 2d, a second light source module 2e and a third light source module 2f. The at least one light source adjusting device 3 comprises a first light source adjusting device 3d, a second light source adjusting device 3e and a third light source adjusting device 3f corresponding to the first light source module 2d, the second light source module 2e and the third light source module 2f respectively. In this embodiment, the first wavelength is an ultraviolet light (UV light) wavelength, while the second wavelength is one of a blue light wavelength, a green light wavelength and a red light wavelength. In detail, in this embodiment, the light sources 21 utilize an UV light. In addition the second wavelength of the first light source adjusting device 3d is the green light wavelength, the second wavelength of the second light source adjusting device 3e is the red light wavelength, and the second wavelength of the third light source adjusting device 3f is the blue light wavelength. Therefore, in the third embodiment, the light beam projected by the projection system 1 is obtained through the combination, via the optical units in the projection system 1, of a green light G emitted by having the UV light pass through the first light source module 2d and the first light source adjusting device 3d, a red light R emitted by having the UV light pass through the second light source module 2e and the second light source adjusting device 3e and a blue light B emitted by having the UV light pass through the third light source module 2f and the third light source adjusting device 3f.

According to the above descriptions, by adopting LEDs as a light source and through the special design of the light source adjusting device for a projection system of the present invention, both the luminance and the light emitting efficiency of the projection system are significantly improved and such problems in the prior art as liability for failure and long response times are avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source adjusting device for a projection system, the projection system further comprising a light source module which is capable of providing a first beam with a first wavelength, the light source adjusting device comprising:
   a first angle selecting layer for receiving the first beam and allowing a first portion of the first beam to pass therethrough to form a second beam having the first wavelength, in which the first portion is a portion of the first beam that is less than an incident angle;
   a wavelength converting layer for receiving the second beam transmitted from the first angle selecting layer and converting the second beam having the first wavelength into a third beam having a second wavelength; and
   a second angle selecting layer for receiving the third beam and allowing a third portion of the third beam to pass therethrough to form a fourth beam having the second wavelength, in which the third portion is a portion of the third beam that is less than an emergence angle; and
   the light source module comprises:
      a light source for providing a light beam;
      a beam splitting unit, wherein the light beam passes through the beam splitting unit to form the first beam with the first wavelength; and
      a beam collecting unit for collecting the first beam to the first angle selecting layer;
      wherein the second wavelength is larger than the first wavelength, and the emergence angle is less than the incident angle;
      the first angle selecting layer is disposed on a first surface of the wavelength converting layer, and the second angle selecting layer is disposed on a second surface of the wavelength converting layer opposite to the first surface; and
   wherein a fourth portion of the third beam larger than or equal to the emergence angle is reflected by the second angle selecting layer, the fourth portion passes through the wavelength converting layer and then scatters from the first angle selecting layer at a scattering angle, and the scattering angle is substantially less than or equal to the incident angle; the fourth portion is then transferred from the beam collecting unit to the beam splitting unit, and the beam splitting unit reflects the fourth portion to the beam collecting unit so that the beam collecting unit collects the fourth portion to the first angle selecting layer.

2. The light source adjusting device as claimed in claim 1, wherein the beam collecting unit is a convex lens.

3. The light source adjusting device as claimed in claim 1, wherein the beam splitting unit is a dichroic mirror.

4. The light source adjusting device as claimed in claim 1, wherein at least one of the first angle selecting layer and the second angle selecting layer is a multi-layer coating.

5. The light source adjusting device as claimed in claim 1, wherein the first angle selecting layer defines the incident angle, and the second angle selecting layer defines the emergence angle.

6. The light source adjusting device as claimed in claim 1, wherein the incident angle is substantially between ±30 degree and ±90 degree.

7. The light source adjusting device as claimed in claim 1, wherein the emergence angle is substantially between ±20 degree and ±30 degree.

8. The light source adjusting device as claimed in claim 1, wherein the wavelength converting layer comprises a phosphor.

9. The light source adjusting device as claimed in claim 1, wherein the first wavelength is between 420 nm~490 nm.

10. A projection system, comprising:
   a light source adjusting device including:
      a first angle selecting layer for receiving a first beam having a first wavelength and allowing a first portion of the first beam to pass therethrough to form a second beam having the first wavelength, in which the first portion is a portion of the first beam that is less than an incident angle;
      a wavelength converting layer for receiving the second beam transmitted from the first angle selecting layer and converting the second beam having the first wavelength into a third beam having a second wavelength; and
      a second angle selecting layer for receiving the third beam and allowing a third portion of the third beam to pass therethrough to form a fourth beam having the second wavelength, in which the third portion is a portion of the third beam that is less than an emergence angle;
   a light source module including:
      a light source for providing the light beam;
      a beam splitting unit, wherein the light beam passes through the beam splitting unit to form the first beam with the first wavelength; and
      a beam collecting unit for collecting the first beam to the first angle selecting layer; and
   an imaging module for receiving and processing the fourth beam to form an image;

wherein the second wavelength is larger than the first wavelength, and the emergence angle is less than the incident angle;

wherein the first angle selecting layer is disposed on a first surface of the wavelength converting layer, and the second angle selecting layer is disposed on a second surface of the wavelength converting layer opposite to the first surface; and wherein a fourth portion of the third beam larger than or equal to the emergence angle is reflected by the second angle selecting layer, the fourth portion passes through the wavelength converting layer and then scatters from the first angle selecting layer at a scattering angle, and the scattering angle is substantially less than or equal to the incident angle; the fourth portion is then transferred from the beam collecting unit to the beam splitting unit, and the beam splitting unit reflects the fourth portion to the beam collecting unit so that the beam collecting unit collects the fourth portion to the first angle selecting layer.

11. The projection system as claimed in claim 10, wherein the light source is an ultraviolet light (UV light), the at least one light source module comprises a first light source module, a second light source module and a third light source module, the at least one light source adjusting device comprises a first light source adjusting device, a second light source adjusting device and a third light source adjusting device corresponding to the first light source module, the second light source module and the third light source module, the second wavelength of the first light source adjusting device is a green light wavelength, the second wavelength of the second light source adjusting device is a red light wavelength, and the second wavelength of the third light source adjusting device is a blue light wavelength.

12. The projection system as claimed in claim 10, wherein the imaging module comprises one of a liquid crystal display (LCD) unit, a digital micro-minor device (DMD) and a liquid crystal on silicon (LCoS) unit.

13. The projection system as claimed in claim 10, wherein the light source is a blue light emitting diode (blue LED), the at least one light source module comprises a first light source module and a second light source module, the at least one light source adjusting device comprises a first light source adjusting device and a second light source adjusting device corresponding to the first light source module and the second light source module, the second wavelength of the first light source adjusting device is a green light wavelength, and the second wavelength of the second light source adjusting device is a red light wavelength.

* * * * *